(12) United States Patent
Schutzer

(10) Patent No.: US 6,873,974 B1
(45) Date of Patent: Mar. 29, 2005

(54) SYSTEM AND METHOD FOR USE OF DISTRIBUTED ELECTRONIC WALLETS

(75) Inventor: Daniel Schutzer, Scarsdale, NY (US)

(73) Assignee: Citibank, N.A., New York, NY (US)

( * ) Notice: Subject to any disclaimer, the term of this patent is extended or adjusted under 35 U.S.C. 154(b) by 411 days.

(21) Appl. No.: 09/640,037

(22) Filed: Aug. 16, 2000

Related U.S. Application Data
(60) Provisional application No. 60/149,304, filed on Aug. 17, 1999.

(51) Int. Cl.[7] .............................................. G06F 17/60
(52) U.S. Cl. ............................. 705/41; 705/26; 705/39; 705/40; 235/379; 235/380; 235/472; 380/23; 380/24
(58) Field of Search ............................ 705/39, 41, 40; 380/23, 24; 235/379

(56) References Cited

U.S. PATENT DOCUMENTS

| | | | |
|---|---|---|---|
| 5,221,838 A * | 6/1993 | Gutman et al. | 235/379 |
| 5,590,197 A | 12/1996 | Chen et al. | 380/24 |
| 5,748,737 A | 5/1998 | Daggar | 380/24 |
| 5,796,832 A * | 8/1998 | Kawan | 705/65 |
| 5,963,924 A | 10/1999 | Williams et al. | 705/40 |
| 6,016,484 A * | 1/2000 | Williams et al. | 705/39 |
| 6,029,151 A | 2/2000 | Nikander | 705/39 |
| 2001/0011250 A1 * | 8/2001 | Paltenghe et al. | 705/41 |
| 2001/0014878 A1 * | 8/2001 | Mitra et al. | 705/39 |

FOREIGN PATENT DOCUMENTS

| | | | | |
|---|---|---|---|---|
| IL | 0 172 670 A2 * | 2/1986 | | G07F/7/00 |

OTHER PUBLICATIONS

Stallings, W. "Data and Computer Communications", 1994, MacMillan Publishing Co., New York, US, XP002069639, pp. 636–644, 663–666.*

"An ATM Model For Internet Payments," *Report on Home Banking& Financial Services*, v. 2, n. 11, p. 6, Mar. 14, 1997.

"Ashford.com Adds Microsoft Passport To Luxury Retail Site; New E–Commerce Service Makes Shopping Even Easier For Ashford.com Customers," *PR Newswire*, p. 3566, Oct. 11, 1999.

(Continued)

*Primary Examiner*—James P Trammell
*Assistant Examiner*—Daniel L. Greene
(74) *Attorney, Agent, or Firm*—George T. Marcou; Kilpatrick Stockton LLP

(57) ABSTRACT

Methods and systems whereby two electronic wallets communicate and exchange information. In one such system, a consumer's personal electronic wallet communicates with the exclusive or preferred wallet of a web merchant. In one such system, an internet consumer registers with a web merchant's exclusive or preferred electronic wallet ("merchant wallet") and provides consumer information (e.g., credit card number, mailing address, and other information) to the merchant wallet, which is stored by the merchant wallet in a database on the merchant server. Such information may be automatically populated by the consumer's personal electronic wallet. The consumer maintains current consumer information in a consumer electronic wallet on the consumer's personal computer. When the consumer visits the merchant site again, and orders goods or services, the merchant's preferred wallet can be automatically updated by the consumer's electronic wallet if any of the data in the merchant's wallet has changed. For example, the consumer wallet examines the information in the merchant wallet to determine if the information in the merchant wallet conforms to the current information in the consumer wallet. If the information does not conform, the consumer wallet communicates the current consumer information to the merchant wallet.

40 Claims, 3 Drawing Sheets

OTHER PUBLICATIONS

"BizRate.com Survey Reveals Use Of Digital Wallets Is Limited; 58 Percent Of Online Users dont's Know What A Digital Wallet Is," *PR Newswire*, p. 1802, Sep. 7, 1999.

Violino, Bob, "Banking On E–Business—Citigroup Is Dramatically Expanding Its Internet Presence In An Effort To Approach Its Target Of 1 Billion Customers," *Information Week*, p. 44(1), May 3, 1999.

"Server–Side Digital Wallet From GlobeID, @PayIssuer Addresses Card Issuers' Competitive Challenges And Empowers Cardholders," *Business Wire*, Dec. 7, 1999.

"GLOBEID: GlobeID Delivers First Implementation Of Electronic Commerce," *M2 Presswire*, Jul. 7, 1999.

Zgodzinkski, David, "Click Here To Pay," *Internet World*, v. 8, n. 9, p. 60(7), Sep. 1997.

"C&A: C&A Offers The SETT Wallet For Secure Internet Shopping," *M2 Presswire*, Aug. 4, 1999.

* cited by examiner

SYSTEM AND METHOD FOR USE OF DISTRIBUTED ELECTRONIC WALLETS

CROSS REFERENCE TO RELATED APPLICATION

This patent application claims priority to co-pending U.S. Provisional Patent Application Ser. No. 60/149,304, entitled "System and Method for Use of Distributed Wallet," filed Aug. 17, 1999, which is hereby incorporated in full by reference.

FIELD OF THE INVENTION

The present invention relates generally to the field of electronic commerce. More particularly, the present invention relates to systems and methods for using distributed electronic wallets in electronic commerce.

BACKGROUND

In conventional electronic transactions on the world wide web, an internet merchant typically provides an internet consumer who wishes to purchase goods or services from the merchant with an order form to fill out in order to complete the transaction. The order form typically requests payment information (e.g., a credit card number and expiration date) and shipping information (e.g., a mailing address). In some conventional processes, the purchasing consumer types in the information needed or requested by the merchant each time the consumer wishes to place an order.

Electronic wallets allow users to avoid typing in such information repeatedly by storing the information in the wallet. They can also automatically perform conventional security functions, automated payment functions, and protocol functions required. There are several conventional electronic wallets with a variety of operation modes. Some electronic wallets are merchant wallets (e.g., Microsoft's Wallet). They are embedded in route and some are located at a merchant web site. Some electronic wallets are located at a third-party's web site. Such wallets may comprise either a single electronic wallet for several merchants or separately-branded wallets for each merchant. Typically, if the wallets are separately branded for each merchant, the wallets will have a different look and feel for each merchant, but will use common software to carry out the wallet's function. Other wallets are consumer-oriented (e.g., conventional Brodia brand and Obongo brand wallets), and comprise wallets for a consumer that the consumer can use to pay for goods or services at various merchant sites. These wallets can be located at an end-user device, such as a personal computer or smart card (e.g., a conventional American Express Blue Card), or at a third party web site (e.g., a conventional GlobeSet site).

Electronic wallets may also include one-click shopping systems (e.g., similar to that employed by Amazon.com) in which the consumer inputs the consumer's credit-card information upon registration, and such information is stored by the merchant. Subsequently, the consumer provides the consumer's identity (through the use of cookies, password, or other authentication technique) by simply selecting (by clicking a mouse button, for example) the items that the consumer wishes to purchase, which gives the merchant permission to charge the stored credit card number with the purchase price, and ship the product to the associated address. Electronic wallets may also include or be associated with payment engines, such as software and services associated with implementing a payment protocol (e.g. Secure Electronic Transaction (SET)) and link to a payment processing service. Examples of conventional full-featured wallets include those associated with GlobeSet and IBM.

Conventional wallets comprise a single entity that operates between a merchant and a consumer. That is, a conventional wallet is essentially in the middle of the merchant and the consumer, and is used by both. The consumer communicates with the wallet, and the wallet communicates with the merchant through the merchant's web site. The merchant receives information from the wallet.

Thus, typical conventional wallet systems and transactions are structured such that a single electronic wallet is in communication with both the consumer and the merchant to carry out an internet transaction. In some conventional systems, when a merchant requests information associated with an order from a consumer by sending a form to the consumer, the consumer's personal computer sends the request to an electronic wallet associated with the consumer. The wallet completes the order form by providing the requested information by providing information previously input by the consumer, and the consumer fills in the information not filled in by the wallet. The wallet then sends the populated form containing the provided information to the merchant. Such consumer-oriented electronic wallets may reside on the consumer's personal computer, on the web server of the consumer's bank, or other location.

In other conventional systems, a single wallet residing on the merchant server may be used (sometimes called a "virtual wallet"). In such systems, a consumer registers with the merchant and provides requested information (e.g., credit card number) in a web-based form provided by the merchant. The information is stored in the wallet. Later, when the customer orders goods or services from the merchant site, the merchant site will access the wallet stored on its server that is associated with the consumer, and the request form will appear pre-filled out, or pre-populated, when sent or shown to the consumer. If the consumer wishes to change any information pre-filled out in the form, the consumer alters the information by editing the pre-populated data and providing any missing data. The consumer then sends the form data to the merchant. Such a wallet is sometimes called a merchant wallet. The merchant wallet may reside at the merchant's bank, on the merchant's server, or on another server. Likewise, an end user may choose to have more than one consumer wallet. Each wallet may provide different incentives motivating the end user to use different wallets at different times and under different circumstances, or to switch between wallet providers.

End-user electronic-wallet providers and merchants (and their wallet providers) sometimes promote their wallets as the preferred wallet. For example, a merchant may promote its wallet as the wallet that the merchant prefers its customers use when purchasing goods or services from the merchant.

Some merchants will accept payment only through their preferred electronic wallet, thereby causing their preferred wallet to function as their exclusive electronic wallet. Others will accept multiple wallets, but will provide some benefit to customers who use the merchant's preferred wallet, or otherwise encourage the use of their preferred wallet.

There are a variety of disadvantages associated with conventional wallet systems and methods. For example, situations arise in which a merchant promotes the use of the merchant's preferred electronic wallet, but consumers that visit the merchant's web site have their own preferred electronic wallets (e.g., an electronic wallet from a supplier of such wallets). A consumer may find the look and feel of the consumer's preferred wallet much more desirable than that of other wallets.

A consumer may have multiple electronic wallets for use with multiple merchants, but such a situation is often undesirable because it is a burden to the consumer to update, track, and maintain the consumer's data in multiple wallets. Moreover, standardization of information communicated from a wallet to a merchant is often important. Examples of such standardized data include credit-card number, expiration date of the associated card and shipping information.

One disadvantage of conventional systems using a merchant wallet is that the information stored by the merchant may become old and invalid. For example, the consumer may move after providing the information to the merchant for storage in the merchant wallet. Thus, when ordering from the merchant afterward, the consumer must physically change the address shown. As another example, the information stored and shown may comprise an expired credit card or a credit card that the consumer does not wish to use for the particular transaction.

Thus, it is desirable to a consumer to use the consumer's preferred wallet (which, in conventional systems, is sometimes multiple wallets), and it is desirable to a web merchant for consumers to use the merchant's preferred wallet. In the conventional mode of operation, these desirable qualities are often not met (as it would require users to maintain and update a multiplicity of wallets, and to remember how to log into each wallet). It is further desirable to provide a wallet system and method not having the disadvantages described above. What is needed is a system and method for allowing a consumer to use one or more of the consumer's preferred wallets and for the merchant to receive order data from the merchant's preferred wallet and that eliminates or minimizes the disadvantages of conventional systems and methods as discussed above.

SUMMARY OF INVENTION

The present invention includes methods and systems for carrying out transactions on the internet using distributed electronic wallets. One embodiment comprises receiving an indication that an internet user wishes to finalize a transaction with a web merchant (or to load a new or alternative consumer wallet), presenting a first electronic wallet associated with the merchant (or the alternative consumer wallet), and automatically receiving in the first electronic wallet updated consumer information from a second electronic wallet associated with the internet user. The first and second wallets may communicate in a number of ways. One example is screen scraping, whereby, for example, a wallet learns the format presented and creates a template indicating data placement, such as user identification and password, IP address, cookie information, or other authenticated information required to access the screen or wallet. Another example comprises a standard data feed or message protocol standard, such as Electronic Commerce Modeling Language (ECML), Open Financial Exchange (OFX), or Interactive Financial Exchange (IFX) standards. Some such feeds may require customer identification and wallet identification and authentication. A third example comprises an exchange of files between wallets, an embodiment of which also requires exchange of identification and authentication information.

The electronic wallets may reside at any location. For example, the first electronic wallet (sometimes called a merchant wallet) may reside on a web server associated with the merchant. The second electronic wallet (sometimes called a consumer wallet) may reside, for example, on a personal computer associated with the internet user (e.g., in the form of a wallet application residing on the user's personal computer), on a web server associated with a third party, in a telephone, or in a personal digital assistant. In embodiments, the first electronic wallet comprises the preferred or exclusive wallet accepted by the web merchant or the alternative consumer wallet.

Other embodiments also include identifying the internet user (such as through the use of an identifying cookie or through the receipt of a user name and password) and accessing stored consumer data associated with the internet user previously provided by the internet user and stored in a database associated with the merchant web site. An embodiment uses the stored consumer data to populate the first electronic wallet. The second electronic wallet then examines the populated data of the first electronic wallet and provides updated consumer information to the appropriate fields in the first electronic wallet. For example, if a user has moved or the old credit number has expired or changed.

Other embodiments include the use of a financial payment engine. For example, a consumer wallet may request that such an engine provide payment to the merchant as a result of a transaction between the consumer and the merchant.

That is, in an embodiment, a method and system is provided whereby a consumer electronic wallet communicates with the exclusive or preferred wallet of a web merchant. In an embodiment, at one point in time, a consumer registers with a web merchant's exclusive or preferred electronic wallet ("merchant wallet") and provides consumer information (e.g., credit card number, mailing address, and other information) to the merchant wallet, which is stored by the merchant wallet in a database on the merchant server. The consumer maintains current consumer information in a consumer electronic wallet on the consumer's personal computer. When the consumer visits the merchant site again, and orders goods or services, the merchant will provide the merchant's preferred wallet showing the consumer information previously provided by the consumer. The consumer wallet examines the information in the merchant wallet to determine if the information in the merchant wallet conforms to the current information in the consumer wallet. If the information does not conform, the consumer wallet communicates the current consumer information to the merchant wallet by wallet to wallet (consumer wallet to merchant wallet) communication.

There are a variety of advantages, features, and objects associated with various embodiments of the present invention. One advantage, feature, and object of the present invention is that an internet consumer may use the consumer's preferred electronic wallet and an internet merchant with which the consumer conducts a transaction may receive consumer data through the merchant's preferred wallet. Thus, it is an advantage, feature, and object of the present invention to provide a method and system for the consumer to retain the consumer's preferred electronic wallet as the consumer's preferred keeper and wallet, and if the consumer visits a merchant site that expects the consumer to use the merchant's preferred wallet, which is different from the consumer's preferred wallet, the consumer's wallet communicates with the merchant's wallet to carry out the payment transaction. A related advantage, feature, and object is that a consumer may use the consumer wallet with which the consumer has grown accustomed, thereby increasing the consumer's efficiency, comfort, and accuracy in the use of electronic wallets. Such an increase benefits consumers and merchants.

Another, related advantage, feature, and object is that the consumer avoids the burden of updating, tracking, and maintaining multiple wallets. A further advantage, feature, and object is that old and invalid consumer information stored by a merchant may be automatically updated during a transaction between a consumer and the merchant.

It is likewise an advantage, feature, and object of the present invention to provide a method and system in which the consumer's wallet communicates with the merchant's wallet. It is also an advantage, feature, and object of the present invention that both the merchant's preferred wallet is used and the consumer's preferred wallet is used, even though their preferred wallets are different or of different types.

It is a further advantage, feature, and object of the present invention that merchants that do not accept non-preferred wallets will receive the information desired to achieve receipt of payment even when the customer will not use the merchant's preferred wallet. It is also an advantage, feature, and object of the present invention that the merchant, or the merchant's preferred wallet, seeks information that can be provided by another wallet or a customer's agent. It is a still further advantage, feature, and object of the present invention to provide a system and method which facilitates wallet-to-wallet communication.

Moreover, it is an advantage, feature, and object of the present invention to provide a master wallet that may either communicate information to a merchant's form or communicate with other wallets to provide those wallets with information. In this manner, information is provided to the merchant's form and/or other wallets just as if the consumer was typing the information into the form or other wallet.

Additional advantages, features, and objects, of the invention will be set forth in part in the description which follows, and in part will become more apparent to those skilled in the art upon examination of the following, or may be learned by practice of the invention.

DETAILED DESCRIPTION

Embodiments of the present invention include methods and systems for carrying out transactions on the internet using electronic wallets. In one embodiment, a method and system that uses distributed wallets is provided which allows a consumer electronic wallet to communicate with the exclusive or preferred electronic wallet of a web merchant.

Figure 1:
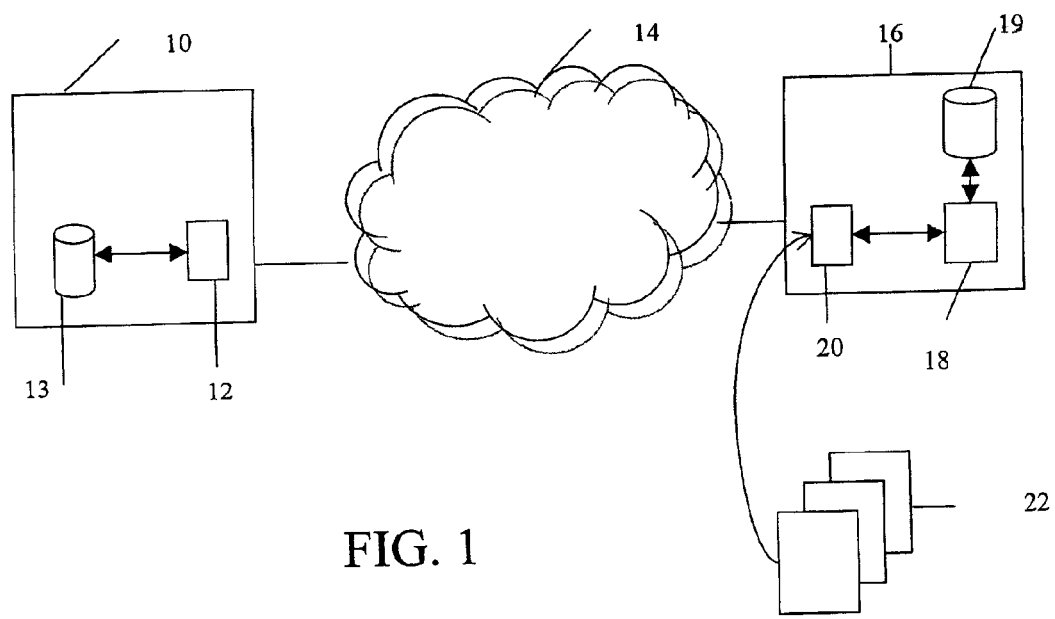
FIG. 1 shows a system according to the present invention.

FIG. 1 shows an embodiment of a system according to the present invention. A consumer's computer 10 is connected to the internet 14. The computer 10 shown is a personal computer (PC), and includes an internet browser (not shown), such as Microsoft Internet Explorer or Netscape Navigator. The computer 10 also includes an electronic wallet 12. The wallet 12 comprises software associated with the browser for managing storage and communication of information about the consumer, such as payment information and shipping information. The wallet 12 has access to personal information about the consumer, including the consumer's current mailing address, full name, and the consumer's credit card type, number, and expiration date. The information is stored in memory. In the system shown, the information is stored in a data file in data storage means 13 (e.g., a hard disk drive). The hard disk drive 13 on which such information is stored is in communication with the consumer wallet 12. The wallet 12 is called a consumer wallet because it includes the consumer's information and is associated with the consumer.

FIG. 1 also shows a web server 16 that includes a merchant web site 20 and an electronic wallet 18. The web server 16 is connected to the internet 14. The merchant web site 20 includes web pages 22 that display goods and services available for purchase. The wallet 18 includes fields into which the merchant site requests that consumers desiring to purchase goods or services available on the web site 20 insert their personal information, such as name, mailing address, and credit card type, number, and expiration date. In the system shown, the wallet 18 receives such information from a consumer and stores the information provided in a database 19 associated with the web server 16. The wallet 18 is called a merchant wallet because it is associated with the merchant. In the system shown, the merchant wallet 18 is the electronic wallet that the merchant prefers to use in accepting payment for goods and services ordered from the merchant web site 20 by the consumer. The web server 16 also includes hardware and software for receiving communication from internet users via the internet, for sending data (e.g., web pages) to internet users via the internet, managing the analysis of data (e.g., data in an electronic wallet, user transaction history (pages viewed and items placed in a shopping cart)) and the display of data (e.g., on a web page associated with an electronic wallet, shopping pages, and the like), for managing and initiating various computer applications (e.g., electronic wallet applications, shopping cart applications, and the like), for accessing data stored on the web server 16 and elsewhere, and for communicating with financial payment engines.

In the embodiment shown in FIG. 1, at one point in time, a consumer associated with the consumer PC 10 uses an internet browser on the PC 10 to view the web pages 22 of the merchant site 20, and chooses to purchase goods displayed for sale on the site 20. Upon receipt of an indication that the consumer wishes to purchase goods displayed on the site by the web site 20, at least the first time the consumer visits the web site 20, the web site 20 presents the consumer (through the consumer's PC 10) with a web-based form requesting personal, consumer information (or data) about the consumer, such as name, mailing address, telephone number, e-mail address, and credit card type, number, and expiration date. The web-based form is part of the merchant wallet 18. The consumer receives the form and provides the requested information in the web-based form and provides the information to the web site 20. The web site 20 stores the personal information received from the consumer in the server database 19. The web site 20 can also select and send identifying data (in this case, a customer number) that identifies the consumer in the form of a cookie to the consumer's PC 10. The cookie is stored on the consumer's hard drive 13. The personal information received from the consumer's PC 10 is stored in the server database 19 in association with the identifying data for later retrieval based on the identifying data. The web site 20 then completes the processing of the consumer's order.

Thereafter, the consumer inputs current consumer information into an electronic wallet (called a consumer wallet) 12 stored on the consumer's PC 10. The consumer wallet 12 includes form fields requesting consumer information such as name, mailing address, telephone number, e-mail address, fax number, organization name (if any), street address (if different from mailing address), and credit card type, number, and expiration date. This information is stored in the hard disk drive 13 associated with the consumer's PC 10.

Figure 3:
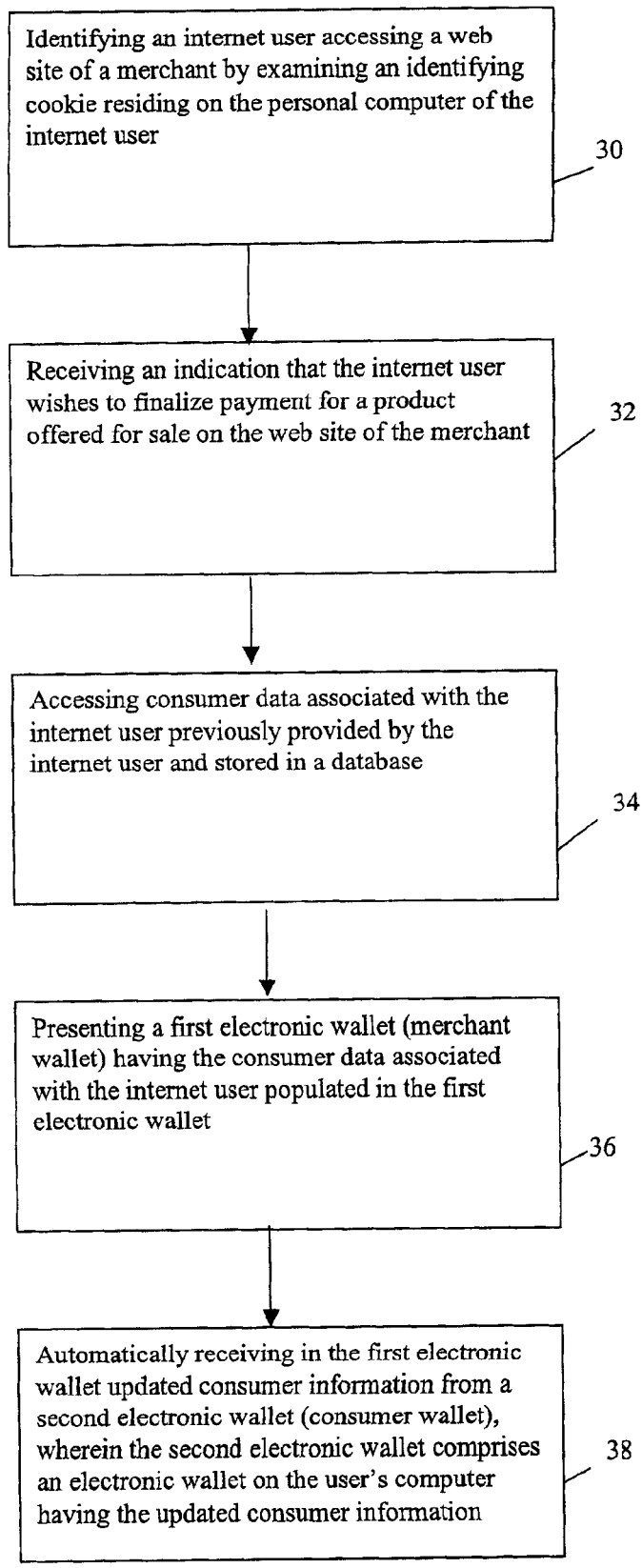
FIG. 3 shows a flow diagram of a method according to the present invention.

Referring to FIG. 1 and FIG. 3, later the consumer again accesses the merchant's web site 20 using a browser on the consumer's PC 10. Referring to FIG. 1 and FIG. 3, the web site 20 identifies the consumer accessing the merchant web site 30. In the embodiment shown, the web site 20 identifies the consumer by examining the consumer's PC 10 to determine whether a cookie placed by the merchant is present on the PC 10, and detects the cookie containing the identifying information that the web site 20 previously placed on the consumer's PC 10. The web site 20 examines the information contained in the cookie and determines the customer number, thereby identifying the consumer. Those of ordinary skill in the art will recognize that there are other ways of identifying the visiting internet consumer. For example, in an embodiment, a user name and password supplied by the consumer to the merchant site is used by the merchant site to identify the consumer.

The consumer then views the goods and services available for purchase shown on the web pages 22 of the web site 20. The consumer selects goods that the consumer wishes to purchase, placing them in an electronic shopping cart available on the web site 20. Referring to FIG. 3, after finalizing the consumer's selections, the customer clicks a "Ready to Check Out" button displayed on one of the web pages 22, which causes the customer's browser to send an indication to the web site 20 that the customer wishes to finalize the transaction 32. The web site 20 receives this indication that the consumer wishes to finalize payment associated with the purchase transaction desired by the consumer.

Referring to FIG. 1 and FIG. 3, the web site 20 first accesses the personal consumer data associated with the customer number retrieved from the cookie placed on the consumer's PC 10 that was previously provided by the consumer and stored in the database 34. The web site 20 then presents a first electronic wallet (a merchant wallet) having the consumer data associated with the internet consumer populated in the merchant wallet 36. The web site 20 populates the form fields of the merchant wallet 18 with the corresponding consumer data stored at the site that is associated with the customer number received. The web site 20 sends a merchant wallet web page displaying the form fields of the merchant wallet to the consumer's PC 10 for display using the consumer's internet browser. The form fields include fields for the consumer's name, mailing address, e-mail address, telephone number, and credit card type, number, and expiration date.

In the embodiment shown, this first electronic wallet (or merchant wallet) 18 comprises the exclusive wallet accepted by the merchant operating the web site 20. In other embodiments, the merchant wallet presented comprises the preferred electronic wallet of the web site 20. Also, in an embodiment, if the merchant does not automatically present the wallet (e.g., completes the order with previously stored information in a manner transparent to the consumer), then the consumer wallet can request a merchant wallet update form on behalf of the consumer via an agreed-upon wallet-to-wallet protocol.

The consumer's PC 10 receives the merchant wallet web page comprising the populated form fields. The web page indicates information requested by the merchant wallet 18. Upon receipt of the web page, the consumer's PC 10 accesses the consumer wallet 12 stored on the consumer's PC 10. Referring to FIG. 3, the consumer wallet 12 automatically compares the data contained in the form fields of the web page with the current data in the consumer wallet 12 that corresponds to the information requested by the form fields of the merchant wallet 18 and provides the current data to the merchant wallet 38. For example, if the mailing address data shown in the merchant wallet web page sent by the merchant site 20 is different from that which is contained in the consumer wallet 12, the consumer wallet 12 replaces the mailing address shown in the web page with the address contained the consumer wallet 12. Once the consumer wallet 12 completes this comparison and any alterations needed, the PC 10 sends the data now in the merchant wallet web page to the web site 20. In the embodiment shown, the consumer wallet 12 comprises software that manages the receipt of the merchant wallet web page, the comparison and alterations, and the sending of the data to the merchant wallet. In another embodiment, if the consumer wallet had previously filled the requested data into the merchant wallet on behalf of the consumer, then the consumer wallet can determine which version of data is included in the merchant wallet in order to know whether to request a merchant wallet update form from the merchant wallet as described above.

The web site 20 receives the consumer data (updated consumer information) sent by the PC 10 in the merchant wallet 18. The web site 20 then uses the consumer data received in the merchant wallet 18 to complete the consumer's transaction.

The consumer may then visit a different merchant site and complete a transaction in the same manner. When the second merchant site presents a preferred electronic wallet, the consumer wallet provides the requested information, and the transaction is completed as described above.

Figure 2:
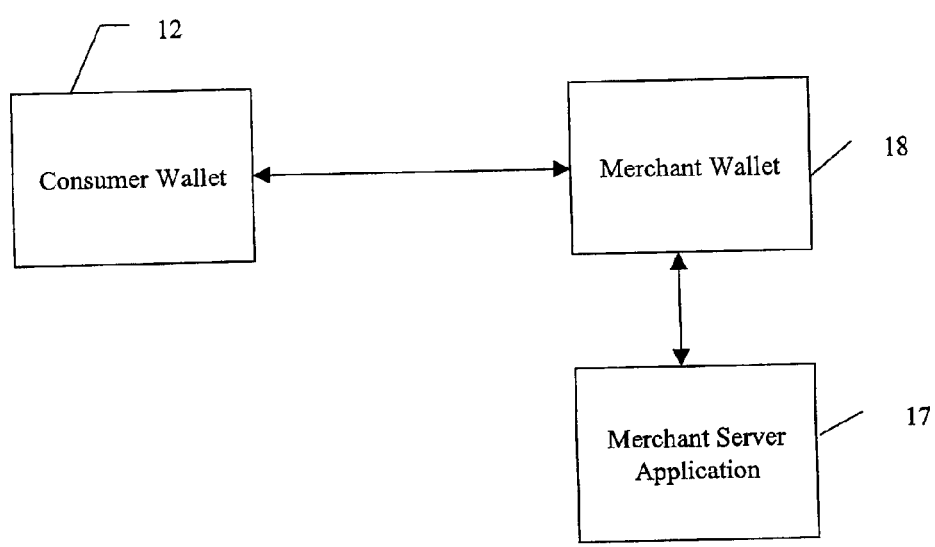
FIG. 2 shows a conceptual diagram of a system according to the present invention.

FIG. 2 shows a conceptual diagram of an embodiment of the present invention. FIG. 2 shows a consumer wallet 12 in communication with a merchant wallet 18. The merchant wallet 18 is in communication with a merchant server application 17 that receives consumer data and finalizes transactions. The merchant server application 17 comprises software to cause an order of goods or services ordered by an internet consumer to be recorded and carried out. As described above, the consumer wallet 12 examines the information in the merchant wallet 18 and provides up to date information from the consumer wallet 12 to the merchant wallet 18. The merchant wallet 18 provides the consumer data received to the merchant server application 17 and the merchant server application 17 finalizes the transaction (e.g., confirms validity of the credit card number provided and communicates with the order fulfillment functions of the merchant).

There are a variety of other embodiments of the present invention. For example, in another embodiment, the consumer has a consumer wallet stored on the consumer's PC when first accessing the merchant site. When presented with the merchant wallet for the first time, the consumer wallet populates the merchant wallet with the requested information using the data in the consumer wallet.

In the embodiment described above with reference to FIG. 1 and FIG. 2, the merchant wallet is located at the merchant site (or on the server that also holds the merchant site) and the consumer wallet is located on the consumer's PC. In other embodiments, the merchant wallet may be located on a different server, such as on the server of the merchant's bank, on a third-party service provider server, or another server. Likewise, the consumer wallet may reside at a location besides the consumer's PC, such as on the server of the consumer's bank or other financial institution or on the merchant server.

In another embodiment, the merchant outsources its wallet application to a third party which places the wallet application for that merchant (and possibly other merchants) on a separate server. When a consumer indicates to the merchant that the consumer wishes to order goods or services, the merchant transfers the consumer to the third-party server on which the wallet application (and an ordering application) resides. The merchant wallet application on the third-party server communicates with the consumer's wallet and/or the consumer to complete the transaction as described above with reference to FIG. 1 and FIG. 2, and provides the consumer information received to the merchant.

Moreover, the consumer wallet and the merchant wallet may be in any form. For example, the consumer wallet may comprise PC-based software on the consumer's PC (e.g., as part of the consumer's internet browser or as a stand-alone application), server-based software on the merchant's web server or a third-party's server, a smart card, a palm/hand-held device, such as a personal digital assistant, or a telephone (e.g., a cellular telephone). Preferably, if the consumer wallet resides on an internet server, the consumer wallet is book-marked in the consumer's browser.

Figure 4:
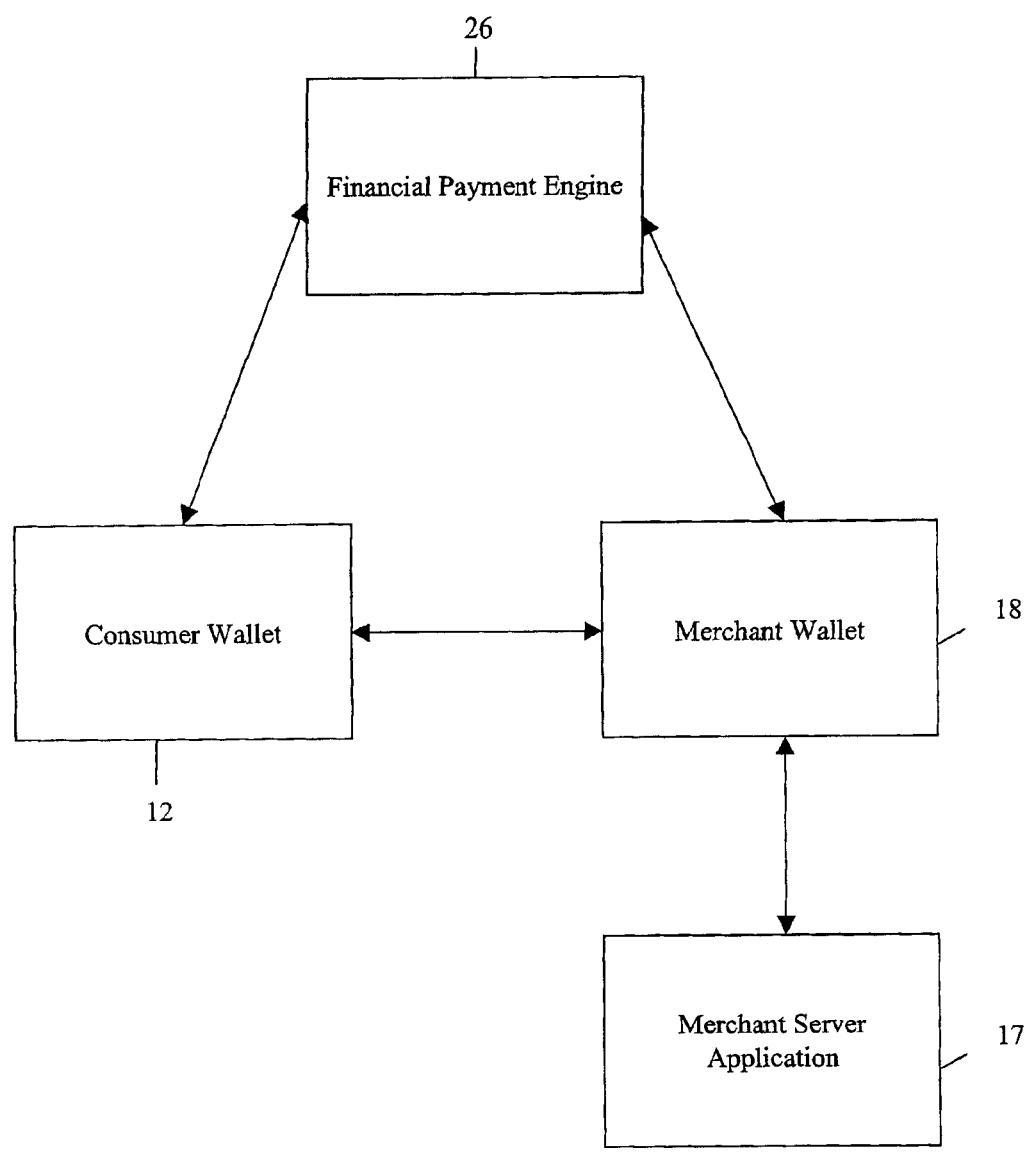
FIG. 4 shows another embodiment of a system according to the present invention.

FIG. 4 shows another embodiment of the present invention. FIG. 4 shows a financial payment engine 26 in communication with the consumer wallet 12 and the merchant wallet 18. Examples of a financial payment engine include a credit card payment management system, Secure Electronic Transaction (SET) systems, Financial Services Technology Consortium (FSTC) electronic check, and online NYCE SafeDebit systems. The payment engine 26 shown comprises software and services associated with implementing a payment protocol (e.g. SET) and a link to a payment processing service. SET (or Secure Electronic Transaction) technology comprises an encryption technology that helps protect the transfer of payment information over open networks, such as the internet.

In the embodiment shown in FIG. 4, the merchant wallet 18 requests and receives the consumer data from the consumer wallet 12 as described in the embodiments above. Once the merchant wallet 18 receives such data, the merchant wallet 18 provides a request for payment, which includes at least part of such consumer data, to the financial payment engine 26. In an alternative embodiment, the financial payment engine can communicate with the consumer wallet directly, as would be the case with a pre-authorized credit or a Automated Clearing House (ACH) Credit Push system wherein the consumer's accounts are debited by the consumer wallets, and credit information is provided to the merchant wallet for deposit in their account. Another reason for the payment engine communicating directly with the consumer wallet is the issuance of a pseudo-credit card number, such as in a Orbion system, and then the pseudo-credit card number is provided to the merchant wallet. Thus, in an embodiment employing pre-authorized credit, an authorization code is presented to the merchant wallet, while in an embodiment employing the pseudo-credit card number, a pseudo-credit card number and an expiration date is presented to the merchant wallet.

The consumer data in the embodiment shown in FIG. 4 comprises information that allows the merchant to submit information to a payment system in order to receive payment for the ordered goods or services. For example, the consumer data may comprise a bank account number. Of course, the present invention may be used to make installment payments or other payments, in addition to the described pay-for-goods-or-services embodiment.

The internet payment engine shown in FIG. 4 is provided by a payment company. The financial payment engine may be in communication with the consumer and merchant directly, or may be in communication with the consumer's bank and the merchant's bank, or some combination thereof. Moreover, the payment engine could be hosted by either of the consumer's bank or the merchant's bank.

The merchant may use the internet payment engine for the merchant's wallet. Moreover, the consumer may use part of the internet payment engine as part of the consumer's wallet, in addition to the consumer's bank. The financial payment engine shown is a common engine that can communicate with either the consumer or the merchant, and works as an agent of the merchant. A financial payment engine that is part of an embodiment of the present invention may also work as the agent of the consumer.

Other embodiments include variations on the operation of the consumer wallet and payment method. For example, referring to FIG. 2, in one embodiment of the present invention, when the consumer wallet 12 receives a request from the merchant wallet 18 for payment, the consumer wallet 12 sends an electronic communication (e.g., an e-mail) via the internet to the consumer's bank requesting that the bank transfer payment to the merchant. In an embodiment, the communication to the consumer's bank includes the customer's bank account number, amount of payment requested, and payment information for the merchant (e.g., an account number to which to transfer the requested payment). The consumer wallet 12 also sends an electronic communication to the merchant wallet 18 informing the merchant wallet 18 that the consumer wallet 12 has requested that the merchant be paid by the consumer's bank.

The first and second wallets may communicate in a number of ways. One example is screen scraping, whereby, for example, a wallet learns the format presented and creates a template indicating data placement, such as user identification and password, IP address, cookie information, or other authenticated information required to access the screen or wallet. Another example comprises a standard data feed or message protocol standard, such as Electronic Commerce Modeling Language (ECML), Open Financial Exchange (OFX), or Interactive Financial Exchange (IFX) standards. Some such feeds may require customer identification and wallet identification and authentication. A third example comprises an exchange of files between wallets, an embodiment of which also requires exchange of identification and authentication information.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

That which is claimed:

1. A method of carrying out transactions on the internet using distributed electronic wallets, comprising:

receiving via a web server an indication that an internet user wishes to finalize a transaction with a web merchant;

presenting via the web server a first electronic wallet associated with the web merchant pre-populated with consumer information of the internet user provided on a preceding occasion;

comparing by a second electronic wallet associated with the internet user the consumer information pre-populated in the first electronic wallet with consumer information for the internet user pre-populated in the second electronic wallet; and if the second electronic wallet identifies at least one aspect of the consumer information pre-populated in the first electronic wallet that is different from a corresponding aspect of the consumer information pre-populated in the second electronic wallet, replacing via the web server said aspect of the consumer information in the first electronic wallet with said corresponding aspect of the consumer information from the second electronic wallet associated with the internet user.

2. The method of claim 1 wherein the first electronic wallet resides on a web server associated with the merchant.

3. The method of claim 2 wherein the second electronic wallet resides on a personal computer associated with the internet user.

4. The method of claim 2 wherein the second electronic wallet resides on the web server.

5. The method of claim 4 wherein the web server is associated with a third party.

6. The method of claim 3 wherein the second electronic wallet comprises an application residing on the personal computer.

7. The method of claim 3 wherein the first electronic wallet comprises an electronic wallet of of a third party.

8. The method of claim 3 wherein the first electronic wallet comprises an electronic wallet of the merchant.

9. The method of claim 3 further comprising identifying the internet user.

10. The method of claim 9 wherein the step of identifying the internet user comprises accessing a cookie present in the personal computer.

11. The method of claim 9 wherein the step of identifying the internet user comprises receiving a user name and password associated with the internet user.

12. The method of claim 9 further comprising accessing stored consumer data associated with the internet user previously provided by the internet user.

13. The method of claim 12 further comprising populating the first electronic wallet with the stored consumer data.

14. The method of claim 3 wherein the second electronic wallet comprises a personal digital assistant.

15. The method of claim 3 wherein the second electronic wallet comprises a telephone.

16. The method of claim 15 wherein the telephone comprises a portable telephone.

17. The method of claim 16 wherein the portable telephone comprises a cellular telephone.

18. The method of claim 3 further comprising communicating a request for payment from a financial payment engine.

19. A method of carrying out transactions on the internet using distributed electronic wallets, comprising:

identifying an internet consumer accessing a web site of a merchant via a web server;

accessing via the web server consumer data associated with the internet consumer previously provided by the internet consumer and stored in a database;

receiving an indication via the web server that the internet consumer wishes to finalize payment associated with a web site transaction at the web site of the merchant;

presenting via the web server a first electronic wallet having the consumer data associated with the internet consumer populated in the first electronic wallet;

comparing by a second electronic wallet associated with the internet consumer the consumer data populated in the first electronic wallet with consumer data for the internet consumer pre-populated in the second electronic wallet; and if the second electronic wallet identifies at least one aspect of the consumer data populated in the first electronic wallet that is different from a corresponding aspect of the consumer data pre-populated in the second electronic wallet, replacing via the web server said aspect of the consumer data in the first electronic wallet with said corresponding aspect of the consumer data from the second electronic wallet, wherein the second electronic wallet comprises an electronic wallet on the consumer's computer.

20. The method of claim 19 wherein the first electronic wallet comprises an electronic wallet of a third party accepted by the merchant.

21. The method of claim 19 wherein the first electronic wallet comprises an electronic wallet of the merchant.

22. The method of claim 19 further comprising communicating a request for payment from a financial payment engine.

23. A system for carrying out transactions on the internet using distributed electronic wallets, comprising:

a web server adapted for receiving an indication that an internet user wishes to finalize a transaction with a web merchant;

wherein said web server is further adapted for presenting a first electronic wallet associated with the web merchant pre-populated with consumer information of the internet user provided on a preceding occasion; and a second electronic wallet associated with the internet user pre-programmed for comparing the consumer information pre-Populated in the first electronic wallet with consumer information for the internet user pre-populated in the second electronic wallet, and if the second electronic wallet identifies at least one aspect of the consumer information pre-populated in the first electronic wallet that is different from a corresponding aspect of the consumer information pre-populated in the second electronic wallet, for replacing via the web server said aspect of the consumer information in the first electronic wallet with said corresponding aspect of the consumer information from the second electronic wallet associated with the internet user.

24. The system of claim 23 wherein the first electronic wallet resides on a web server associated with the merchant.

25. The system of claim 24 wherein the second electronic wallet resides on a personal computer associated with the internet user.

26. The system of claim 24 wherein the second electronic wallet resides on the web server.

27. The system of claim 26 wherein the web server is associated with a third party.

28. The system of claim 25 wherein the second electronic wallet comprises an application residing on the personal computer.

29. The system of claim 24 wherein the first electronic wallet comprises an electronic wallet of a third party.

30. The system of claim 24 wherein the first electronic wallet comprises an electronic wallet of the merchant.

31. The system of claim 25 further comprising means for identifying the internet user.

32. The system of claim 25 wherein the means for identifying the internet user comprises means for accessing a cookie present in the personal computer.

33. The system of claim 25 wherein the means for identifying the internet user comprises means for receiving a user name and password associated with the internet user.

34. The system of claim 31 further comprising means for accessing stored consumer data associated with the internet user previously provided by the internet user.

35. The system of claim 34 further comprising means for populating the first electronic wallet with the stored consumer data.

36. The system of claim 25 wherein the second electronic wallet comprises a personal digital assistant.

37. The system of claim 25 wherein the second electronic wallet comprises a telephone.

38. The system of claim 37 wherein the telephone comprises a portable telephone.

39. The system of claim 38 wherein the portable telephone comprises a cellular telephone.

40. The system of claim 25 further comprising means for communicating a request for payment from a financial payment engine.

* * * * *